(12) United States Patent
Atkins et al.

(10) Patent No.: US 7,729,107 B2
(45) Date of Patent: Jun. 1, 2010

(54) HOUSINGS AND DEVICES FOR DISK DRIVES

(75) Inventors: Andrew William Atkins, Southhampton (GB); Steve Andrew Bailey, Waterlooville (GB); David Ronald Bain Farquhar, Chichester (GB); David John Orriss, Southhampton (GB); Kevin Richardson, Hayling Island (GB)

(73) Assignee: Xyratex Technology Limited, Havant, Hampshire (GB)

( * ) Notice: Subject to any disclaimer, the term of this patent is extended or adjusted under 35 U.S.C. 154(b) by 453 days.

(21) Appl. No.: 11/662,776

(22) PCT Filed: Sep. 9, 2005

(86) PCT No.: PCT/GB2005/003490
§ 371 (c)(1),
(2), (4) Date: Mar. 14, 2007

(87) PCT Pub. No.: WO2006/030185
PCT Pub. Date: Mar. 23, 2006

(65) Prior Publication Data
US 2007/0253157 A1  Nov. 1, 2007

Related U.S. Application Data

(60) Provisional application No. 60/610,532, filed on Sep. 17, 2004.

(51) Int. Cl.
*G01R 33/12* (2006.01)

(52) U.S. Cl. .................... 361/679.02; 361/724; 324/210

(58) Field of Classification Search ............ 361/679.02, 361/724–727; 324/210–212; 454/57
See application file for complete search history.

(56) References Cited

U.S. PATENT DOCUMENTS

| 4,098,513 | A | | 7/1978 | Klapproth |
| 4,477,127 | A | | 10/1984 | Kume |
| 4,967,155 | A | * | 10/1990 | Magnuson ................... 324/212 |
| 5,145,039 | A | | 9/1992 | Morikawa |
| 5,169,272 | A | * | 12/1992 | Bonora et al. ............ 414/217.1 |

(Continued)

FOREIGN PATENT DOCUMENTS

EP  466 073  1/1992

(Continued)

OTHER PUBLICATIONS

Examination Report from UK Intellectual Property Office issued in GB0700541.6, May 20, 2008, 3 pages.

*Primary Examiner*—Jayprakash N Gandhi
*Assistant Examiner*—Adrian S Wilson
(74) *Attorney, Agent, or Firm*—Pillsbury Winthrop Shaw Pittman, LLP

(57) ABSTRACT

A disk drive test apparatus has a plurality of bays each for receiving a respective disk drive to be tested. A plurality of card slots are provided each for receiving a test card via which a disk drive can be tested. Each of the test cards is either an environment test card or an interface test card. The card slots and the test cards are arranged such that each card slot (6) can selectively receive an environment test card or an interface test card. Other arrangements for disk drive test apparatus or disk drive mounting apparatus are disclosed.

11 Claims, 16 Drawing Sheets

U.S. PATENT DOCUMENTS

| | | | |
|---|---|---|---|
| 5,414,591 A * | 5/1995 | Kimura et al. | 361/679.46 |
| 5,768,249 A | 6/1998 | Ro | |
| 5,851,143 A * | 12/1998 | Hamid | 454/57 |
| 5,903,163 A * | 5/1999 | Tverdy et al. | 324/760 |
| 6,078,455 A | 6/2000 | Enarson | |
| 6,088,660 A * | 7/2000 | Uno et al. | 702/130 |
| 6,169,413 B1 * | 1/2001 | Paek et al. | 324/158.1 |
| 6,388,878 B1 | 5/2002 | Chang | |
| 6,434,498 B1 * | 8/2002 | Ulrich et al. | 702/115 |
| 6,467,153 B2 * | 10/2002 | Butts et al. | 324/212 |
| 6,526,841 B1 * | 3/2003 | Wanek et al. | 324/760 |
| 6,826,046 B1 * | 11/2004 | Muncaster et al. | 361/679.33 |
| 7,165,462 B2 * | 1/2007 | Luo et al. | 324/212 |
| 7,203,060 B2 | 4/2007 | Kay et al. | |
| 7,353,527 B2 | 4/2008 | Preis | |
| 2001/0003300 A1 * | 6/2001 | Soma et al. | 361/700 |
| 2002/0172004 A1 | 11/2002 | Ives | |
| 2006/0061356 A1 * | 3/2006 | Makifuchi et al. | 324/212 |

FOREIGN PATENT DOCUMENTS

| | | |
|---|---|---|
| EP | 779 625 A | 6/1997 |
| EP | 779 625 | 5/2003 |
| EP | 1 577 895 A3 | 2/2005 |
| EP | 1 577 895 A2 | 9/2005 |
| WO | 01/41148 | 6/2001 |
| WO | 02/087211 | 10/2002 |
| WO | WO 03/021597 | 3/2003 |
| WO | WO 03/021598 | 3/2003 |
| WO | 2004/006260 | 1/2004 |
| WO | WO 2004/114286 | 12/2004 |
| WO | 2005024831 A1 | 3/2005 |
| WO | WO 2005/024830 | 3/2005 |

* cited by examiner

HOUSINGS AND DEVICES FOR DISK DRIVES

CROSS REFERENCE TO RELATED APPLICATIONS

This is the U.S. National Phase of PCT/GB2005/003490, filed Sep. 9, 2005, which in turn claims priority to U.S. provisional application Ser. No. 60/610,532, filed Sep. 17, 2004, both of which are incorporated herein in their entirety by reference.

BACKGROUND OF THE INVENTION

1. Field of the Invention

The present invention relates generally to housings and devices for disk drives.

2. Discussion of Related Art

During manufacture of disk drive units, it is necessary to test the disk drive units to ensure that they meet the required specification. For example, the magnetic recording surfaces of the disks are tested for defects and the electronics of the disk drive are also tested. As part of the testing operation, the temperature of the disk drive unit is varied across a wide range to ensure that the performance of the disk drive over that temperature range is satisfactory.

For this purpose, the disk drive units are mounted in apparatus that meets certain requirements. For example, the apparatus has to be capable of controllably varying the temperature of the disk drives. The disk drives are preferably mounted in such a way as to damp vibrations, both to damp vibrations coming into the disk drive from the apparatus and to damp vibrations arising from operation of the disk drive passing out to the rest of the apparatus.

In, our WO-A-01/41148, the entire disclosure of which is hereby incorporated by reference, there is disclosed a disk drive unit carrier. The carrier has a rear section and a front section. A disk drive is mounted in the front section for testing. The rear section contains a fan and valve arrangement for blowing air across the disk drive. The carrier is mounted with many other such carriers in a large frame-like apparatus. Through selective operation of the fan and the valve, the temperature of the disk drive can be controllably varied over a wide range. For this purpose, a heat exchanger is provided to cool the air and a heater is provided to heat the air as desired.

Typically during the test procedure, in a first step a simple power and control connection to the disk drive is made via the apparatus and so-called environment testing is carried out in which the drives carry out a so-called self-test. This first step can be used for example to test the surface of the disk for defects and to ensure that operation over a wide temperature range is satisfactory. Historically, the disk drive has then been moved to a completely separate apparatus in which so-called interface testing is carried out. In interface testing, a full control connection is made to the disk drive, in order for example to check fully that high speed data transfer through the drive's interface can be carried out with satisfactory performance. Thus, historically, there have been two separate testing apparatus, one to carry out the more straightforward environment testing and the other to carry out the more demanding interface testing. As will be understood, having to transfer the disk drives between two apparatus during testing is inconvenient and time-consuming.

The temperature of the disk drive has historically been monitored only indirectly by measuring the temperature of the air flowing across the disk drive and calculating the temperature of the disk drive using look-up tables or the like. However, this requires a high speed and high volume air flow across the disk drive in order to achieve any accuracy. This in turn means that physically large, high power fans are required, which is inconsistent with a need to minimise the size of the apparatus and makes it more difficult to minimise the effect of vibrations arising in the apparatus.

Many of the issues discussed above, e.g. damping of vibrations of the disk drive and control of its temperature, are also relevant to end user storage applications in which one or many disk drives are mounted in storage apparatus for use by end users.

BRIEF SUMMARY OF THE INVENTION

According to a first aspect of the present invention, there is provided disk drive test apparatus, the apparatus comprising: a plurality of bays each for receiving a respective disk drive to be tested; a plurality of card slots each for receiving a test card via which a disk drive can be tested; and, a plurality of test cards, each test card being received in a respective card slot, each of the test cards being either an environment test card or an interface test card; the card slots and the test cards being arranged such that each card slot can selectively receive an environment test card or an interface test card.

In this aspect, the same basic apparatus can be used to allow environment testing and interface testing of a plurality of disk drives. In practice, environment testing takes longer than interface testing. Thus, a manufacturer may arrange the apparatus so that there are several environment test cards for each interface test card. An environment test card may have for example one or more fans, ducting, electronics, etc. all contained as one unit which can easily be swapped for an interface test card which may have a processor and appropriate connection to the disk drive to enable the disk drive's interface to be tested.

The card slots, the or each environment test card and the or each interface test card are preferably arranged such that each card slot can selectively receive an environment test card or an interface test card without interfering physically with any other card slot such that each card slot can be filled with a test card. In this way, all card slots can be used at all times and for example the manufacturer does not have to sacrifice two card slots to accommodate an interface test card.

In one embodiment, the apparatus comprises at least one environment test card and at least one interface test card.

In a preferred embodiment, the apparatus comprises a respective card slot for each bay. Thus, each disk drive can be tested individually with its own dedicated test card.

According to a second aspect of the present invention, there is provided disk drive mounting apparatus, the apparatus comprising: a frame; a disk drive holder for receiving at least one disk drive, the disk drive holder being fixed to or integrally formed with the frame; and, a card holder for receiving at least one card via which a said disk drive, can be tested or operated, the card holder being removably received in the frame.

This arrangement generally separates the mechanical components (in particular the disk drive holder) from the electronics components (in particular the card holder, which typically will carry an environment test card or an interface test card). This arrangement helps to minimise the effect of vibrations on the disk drive(s) as the disk drive holder can be rigidly fixed in relation to the frame. On the other hand, the card holder can be removed, which in practice is necessary for maintenance and upgrade purposes.

In an embodiment, the disk drive holder is constructed and arranged to receive plural disk drives and the card holder is constructed and arranged to receive a corresponding plurality of cards.

In an embodiment, the disk drive holder comprises a disk drive mounting device in which a disk drive can be mounted, the disk drive mounting device being removable from the disk drive holder without having to detach the disk drive holder from the frame. The disk drive mounting device may be in the form of a sleeve-like device into which a disk drive is inserted, the disk drive optionally being supported in a disk drive tray or carrier. This embodiment is particularly useful in that a disk drive mounting device of one type or configuration can easily be exchanged for a disk drive mounting device of another type or configuration in order to accommodate different types of disk drives.

According to a third aspect of the present invention, there is provided disk drive mounting apparatus, the apparatus comprising: a disk drive holder for receiving at least one disk drive; and, a card holder containing at least one card via which a said disk drive can be tested or operated and at least one fan for causing air to pass over a said disk drive; the disk drive holder and the card holder being operatively connected to each other via a non-contact sealing arrangement such that the disk drive holder and the card holder are substantially mechanically isolated from each other whilst air can pass from the card holder into the disk drive holder and over a said disk drive.

In this aspect; the dual requirements for (i) the disk drive holder and the card holder to be substantially mechanically isolated from each other and yet (ii) heating/cooling air to be able to pass between the disk drive holder and the card holder are met. Contact sealing arrangements, such as rubber or similar seals that entirely seal any gaps or connection between the disk drive holder and the card holder, are avoided.

In practice, it is preferred that the disk drive holder and the card holder be arranged such that at least some of the air that has passed over a said disk drive then passes back to the card holder.

In a preferred embodiment, the sealing arrangement is such that there is an air gap between the disk drive holder and the card holder and such that the air experiences a pressure drop as air passes from the card holder into the disk drive holder and as air passes from the disk drive holder into the card holder. In this way, air is inhibited from escaping from the disk drive holder and the card holder through the air gap. It will be understood that it is not necessarily the case that all air has to be prevented from leaking through the air gap and the term "inhibit" shall be construed accordingly.

The at least one card may carry at least one fan for causing air to pass from the card holder into the disk drive holder and over a said disk drive.

According to a fourth aspect of the present invention, there is provided disk drive mounting apparatus, the apparatus comprising: a bay for receiving a disk drive; and, a temperature sensor constructed and arranged to directly sense the temperature of a said disk drive during testing or operation of a said disk drive.

As has been mentioned above, the temperature of the disk drive has historically been monitored only indirectly by measuring the temperature of the air flowing across the disk drive and calculating the temperature of the disk drive. In this aspect, the temperature of the disk drive can be sensed directly. This allows for more accurate monitoring of the temperature of the disk drive and thus better testing and certification of the disk drive. Importantly, it also means that the large fans used in the prior art to achieve a high volume and high speed air flow can be avoided, which saves space and also reduces vibration.

The temperature sensor may be mounted via a biasing arrangement for biasing the temperature sensor into contact with a said disk drive. For example, the temperature sensor may be mounted on a spring arm. This helps to overcome any problems of contacting the disk drive with the sensor which can arise owing to variations in the physical dimensions of the disk drive and the apparatus itself owing to manufacturing tolerances.

In an embodiment, the apparatus comprises a frame which defines the bay, the temperature sensor being mounted to the frame. The temperature sensor can be mounted directly to the frame or indirectly, for example on a connector that is mounted to the frame. In use, the disk drive is connected to the connector (for passing of power and control and data signals). This connection therefore defines a datum point where the position of the disk drive relative to the bay is well defined, it being understood that the remainder of the disk drive may "float" to one degree or another in the bay in order to help minimise the effect of vibration. Mounting the temperature sensor on the connector therefore makes it easier to ensure that the temperature sensor comes into proper contact with a disk drive in use.

In another embodiment, there is provided a removable tray in which a disk drive can be received and which can be removably received in the bay to mount a said disk drive in the bay, the temperature sensor being mounted to the tray. In this embodiment, the position of the disk drive relative to the tray is typically well defined and thus this embodiment again makes it easier to ensure that the temperature sensor comes into proper contact with a disk drive in use.

In another embodiment, the apparatus comprises at least two temperature sensors constructed and arranged to directly sense the temperature of a said disk drive during testing or operation of a said disk drive, the apparatus comprising a frame which defines the bay, at least one temperature sensor being mounted to the frame, the apparatus comprising a removable tray in which a disk drive can be received and which can be removably received in the bay to mount a said disk drive in the bay, at least one temperature sensor being mounted to the tray. This enables two temperature sensors to be used, which allows a comparison to be made of the temperature of the disk drive at different positions on the disk drive. In any event, plural temperature sensors may be provided to measure the temperature of the disk drive at several different positions on the disk drive. Also, it may be desirable to measure the temperature of different types of disk drives at different positions on the respective disk drives. Having more than one temperature sensor means that the same basic apparatus can be used with a wider range of types of disk drives and yet still achieve good accuracy in the temperature measurements.

In the embodiments just described, the tray may comprise a plurality of mounting pins which support a disk drive received in the tray, at least one of the mounting pins having a temperature sensor therein.

In an embodiment, a disk drive is received in the bay, the disk drive having an internal temperature sensor whereby a comparison can be made of the temperature as detected by the temperature sensor of the disk drive mounting apparatus and the temperature as detected by the internal temperature sensor of the disk drive.

According to a fifth aspect of the present invention, there is provided a disk drive mounting device, the device defining a receptacle in which a disk drive tray carrying a disk drive can be received, the device having damping material arranged to damp vibrations in three orthogonal directions.

The preferred embodiment of the device is able to damp vibrations arising from outside the device affecting a disk drive received in the device, and to damp vibrations arising through operation of the disk drive. In practice, the disk drive is rigidly connected to the device whereas the device is "soft" mounted within apparatus such as a frame that supports many such devices.

The damping material is preferably arranged to be at an angle to the rotational axis of a disk drive received in use in the device so that the damping material damps vibrations by a combination of shear and compression/extension of the damping material. Thus, the damping material preferably operates not exclusively in shear mode or compression/extension mode, which makes the material more durable and its operating characteristics more stable and predictable over a wider range of operating conditions.

In an embodiment, the device has two opposed side walls, the exterior of at least one of the side walls having the damping material thereon.

In an embodiment, the at least one of the side walls is arranged so that the exterior of said side wall is at an angle to the rotational axis of a disk drive received in use in the device.

In an embodiment, the device has two opposed side walls, each of said side walls being arranged so that the exterior of each of said side walls is at an angle to the rotational axis of a disk drive received in use in the device, each side wall having damping material thereon, the damping material being arranged so that the damping material damps vibrations by a combination of shear and compression/extension of the damping material.

The device may comprise a mass removably mounted on the device. The mass can be used to tune the vibrational performance of the device, which is especially useful as it can be used to move the centre of rotation of the device away from pivot point of arm of disk drive, which in turns helps to damp vibrations more effectively. Different masses having different sizes, shapes and/or weight can be used for different disk drives.

As can be appreciated, various aspects of the present invention have particular application to housing disk drives when the disk drives are tested during the manufacturing process. However, various aspects of the present invention are not limited to test apparatus as such and relate for example to apparatus and devices for housing disk drives during use in storage applications by end users.

BRIEF DESCRIPTION OF THE DRAWINGS

Embodiments of the present invention will now be described by way of example with reference to the accompanying drawings, in which.

DETAILED DESCRIPTION OF EMBODIMENTS OF THE INVENTION

Figure 1:
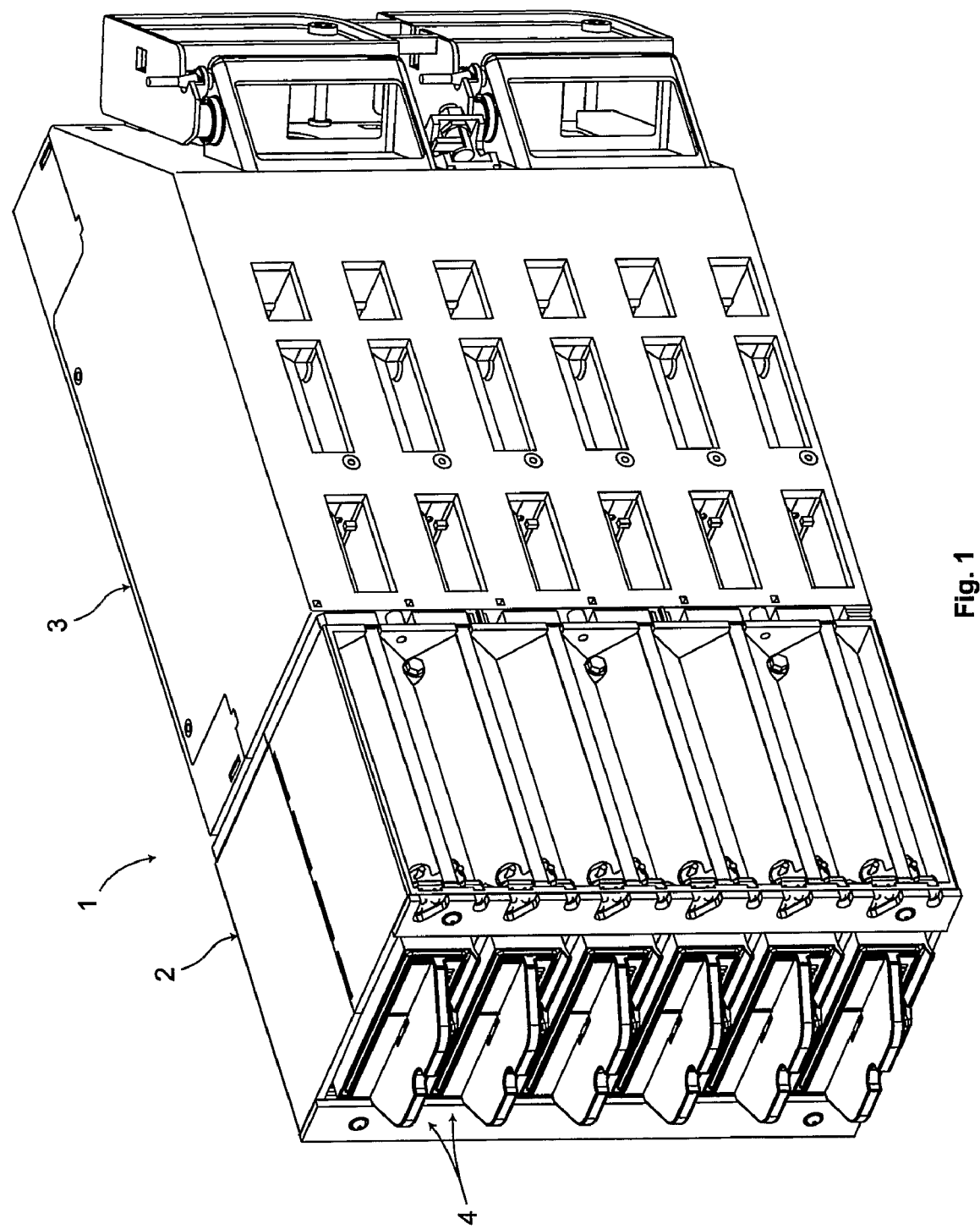
FIG. 1 shows a perspective view of an example of an embodiment of disk drive test apparatus.
Figure 2:
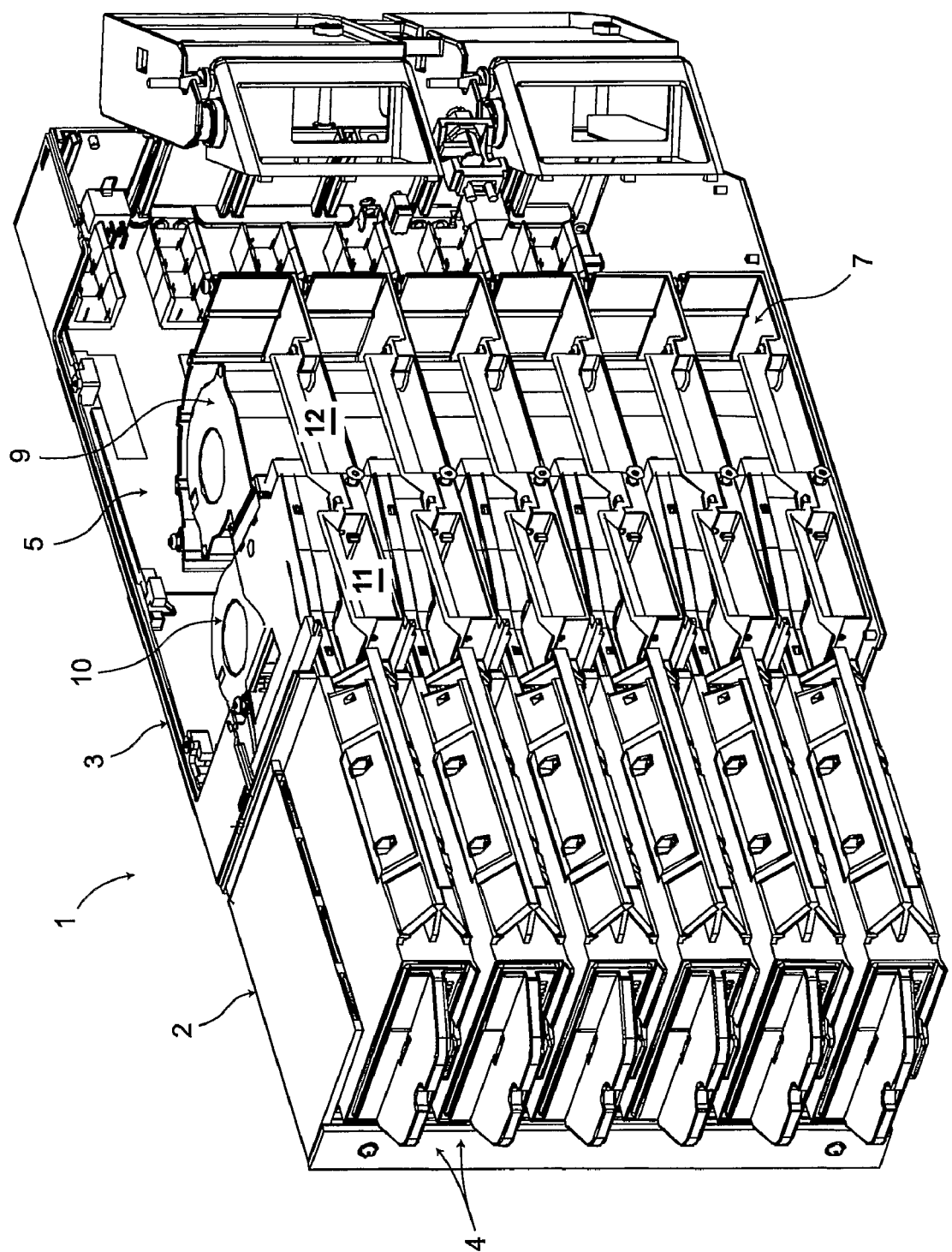
FIG. 2 shows a schematic cut-away perspective view of the apparatus of FIG. 1.

Referring first to FIGS. 1 and 2, a disk drive test apparatus 1 has a front section 2 and a rear section 3. In this example, the front section 2 is removably fixed to the rear section 3. It will be understood that the terms "front" and "rear" are used by convention, the front section 2 being where the disk drives are located in use and the rear section 3 containing the electronics, etc., as will be discussed further below.

In the example shown, the apparatus 1 can house a maximum of six disk drives in separate bays 4 which are arranged vertically one above the other. In use, the apparatus 1 is fixed to a large, typically steel, frame (not shown) with very many other such apparatus 1 so that hundreds or even thousands of disk drives can be carried within the frame at a time. In a preferred embodiment, robots are used to insert disk drives into and remove disk drives from the apparatus 1.

Figure 3:
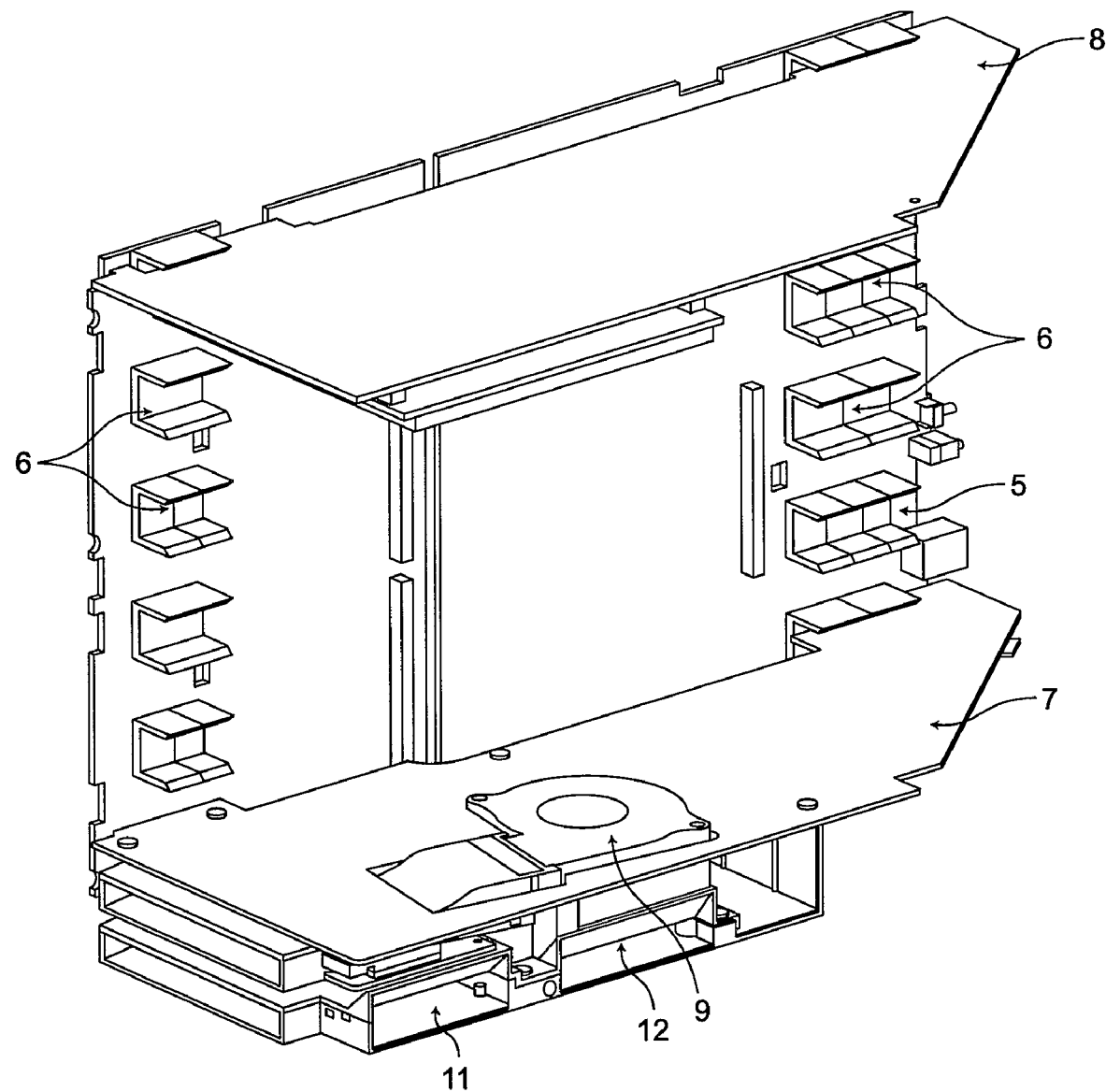
FIG. 3 shows a perspective view showing an example of a control card to which is attached an environment test card and an interface test card.

Referring particularly now to FIGS. 2 and 3, the rear section 3 has a vertically arranged control card 5 having six vertically separated sets of connectors which define slots 6 each for receiving a respective test card. The test cards in this example fall into two types. The first type is a so-called environment test card 7 and the other is a so-called interface test card 8. (In FIG. 2, only environment test cards 7 are shown.)

Each environment test card 7 includes two centrifugal blower fans 9,10. One of these fans 9 is a cooling fan 9 which operates to blow air over the disk drive mounted in use in the bay 4 that is adjacent the environment test card 7. The second fan 10 is a recirculation fan 10 which can be selectively operated to alter the air flow that returns from the disk drive back to the cooling fan 9. In particular, operation of the recirculation fan 10 forces a portion of the air that returns from the disk drive out through a first air duct 11 of the card 7. From there, the air passes through a heat exchanger (not shown) associated with the frame in order to cool that portion of the air. The air then returns through a second duct 12 of the environment test card 7 to the cooling fan 9. The speed of operation of the recirculation fan 10 is varied in order to vary the overall temperature of the air that passes over the disk drive. For example, in one arrangement a higher rotational speed of the recirculation fan 10 forces relatively more air out through the first duct 11, through the heat exchanger and back through the second duct 12. This causes the air that is forced over the disk drive to be relatively cool or cold. On the other hand, a low or zero rotational speed for the recirculation fan 10 means that little or no air passes through the heat exchanger, and thus relatively warm air is passed over the disk drive. A heater (not shown), for example in the form of an electric heating element, can be provided in the air flow path in the environment test card 7 to allow the air to be heated if desired. This arrangement allows the temperature of the air flowing over the disk drive to be varied over a wide range, thus enabling the temperature of the disk drive itself to be varied over a wide range. The provision of two fans 9,10 avoids the need to have a fan above a valve as disclosed in for example our WO-A-01/41148. This in turn means that more environment test cards 7 and therefore more disk drives can be accommodated per unit height in the apparatus 1.

Environment test cards are known per se. The environment test card 7 provides power and data connections to the respective disk drive. The disk drive is operated via the environment test card 7 to carry out a so-called self-test by which the disk drive can test its magnetic recording surface for defects to ensure that they are within permitted tolerances, and to do so over a wide range of temperatures as already mentioned. A certain amount of testing of the electronics of the disk drive can also be carried out via the environment test card 7.

However, to carry out full interface testing of the disk drive, it is necessary to use an interface test card 8. This can be achieved in the apparatus 1 by filling one of the slots 6 with an interface test card 8.

Interface test cards are known per se. In this example, the interface test card 8 and the slots 6 of the control card 5 are arranged so that one or more slots 6 can be populated with a respective interface test card 8 without physically interfering with any of the other slots 6. In other words, every slot 6 can be filled with an environment test card 7 or an interface test card 8, at the choice of the user/manufacturer, thus ensuring that maximum use is made of all of the volume within the rear section 3 of the apparatus 1. In practice, where a manufacturer of disk drives uses many of the apparatus 1 in a frame as described above, it is likely that most of the apparatus 1 will be filled with environment test cards 7 only, with only some of the apparatus 1 having a single interface test card 8. Alternatively, the manufacturer may arrange that most of the apparatus 1 are filled only with environment test cards 7 with some of the apparatus 1 being filled only with interface test cards 8. The overall ratio of environment test cards 7 to interface test cards 8 might be of the order of 50:1 to 90:1 or so.

In summary, the control card 5 and its slots 6, the environment test cards 7 and the interface test cards 8 are constructed and arranged such that the environment test cards 7 and interface test cards 8 are of a comparable size such that each slot 6 can be filled with either an environment test card 7 or an interface test card 8 at the option of the manufacturer.

Figure 4:
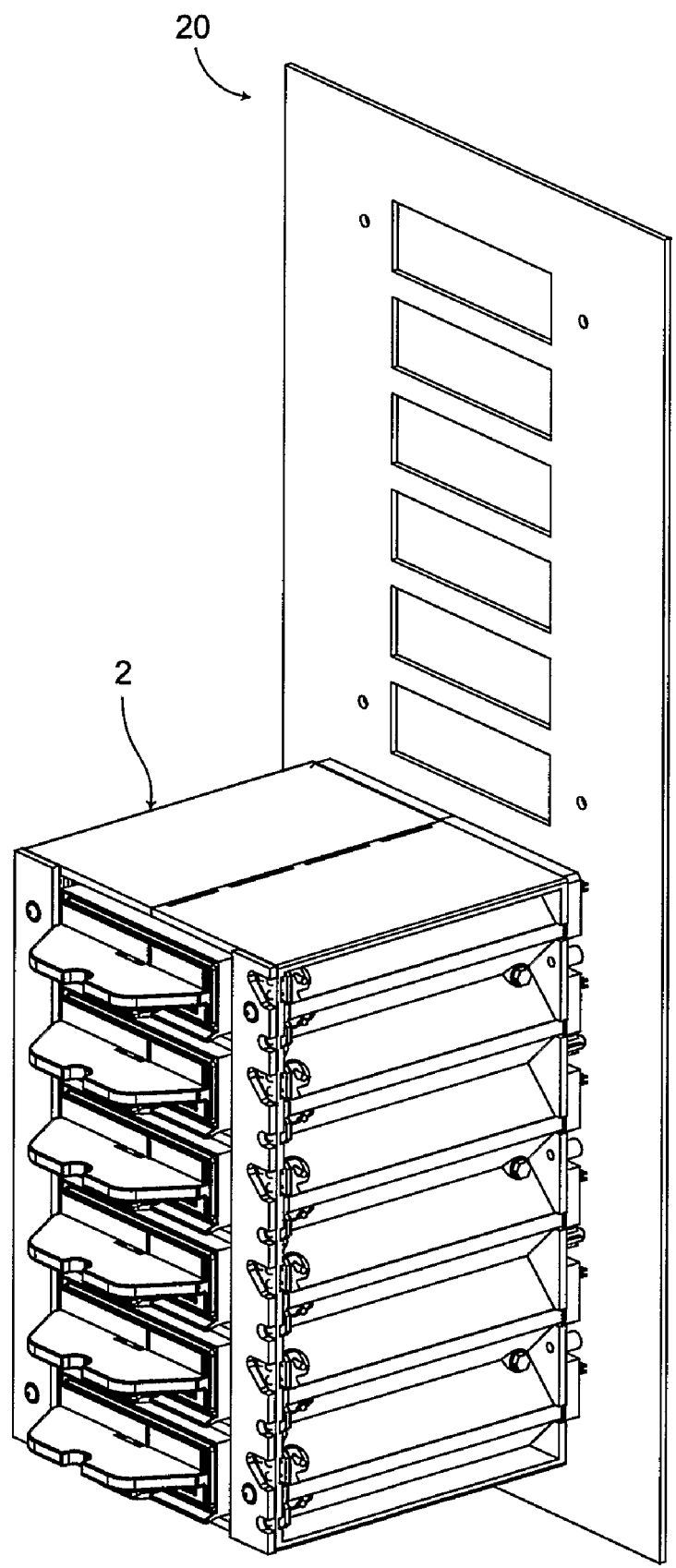
FIG. 4 shows a perspective view showing an example of an embodiment of the connection of a front section of a disk drive test apparatus to a frame.

An important consideration when mounting disk drives, whether during testing of the disk drives during manufacture or use by an end user in storage applications, is to minimise the effect of vibrations. As mentioned previously, it is desirable to minimise the effect of vibrations arising from operation of the disk drives on neighbouring disk drives (i.e. preventing vibration "leaving" the disk drive) and to prevent an individual disk drive being affected by vibration from other components (i.e. to prevent vibration "entering" the disk drive from outside). In one example of the present apparatus 1, as shown in FIG. 4, the front section 2 is connected rigidly to a portion 20 of the frame in which the apparatus 1 is mounted. Conventionally, as in the preferred embodiment disclosed in our WO-A-01/41148 for example, the front and rear sections 2,3 of the apparatus 1 are connected to each other and then mounted as a whole in the frame. However, it has been found that rigidly connecting the front section 2 to a portion 20 of the frame can help to isolate the disk drives mounted in the front section 2 from vibration.

It is intended that this fixing of the front section 2 to the frame 20 be semi-permanent in the sense that normally the front section 2 will be fixed to the frame 20 for the useful life of the apparatus 1. Indeed, it may be desirable to form the front section 2 integrally with the portion 20 of the frame. On the other hand, bearing in mind that the rear section 3 contains electronics, etc., it is desirable that the rear section 3 be relatively easily removable from the frame to allow the various components of the rear section 3, including the test cards 7,8 and the control card 5, to be replaced for repair or upgrade or the like. Thus, in this sense, in this example the front section 2 is fixed to or integrally formed with the frame whereas the rear section 3 is removably received in the frame.

In order to minimise further the effect of vibration, it is desirable to minimise the physical contact between the front and rear sections 2,3 of the apparatus 1. Indeed, ideally, the only physical contact between the front and rear sections 2,3 would be the power and data connections between the test card 7,8 and the disk drive. On the other hand, because air is blown from the rear section 3 into the front section 2 for cooling and heating purposes, it is necessary for there to be an air seal between the front and rear sections 2,3. The desirability to minimise the physical contact between the front and rear sections 2,3 means that it is desirable not to use a mechanical seal, such as a rubber duct or seal around the junction between the front and rear sections 2,3.

Figure 5:
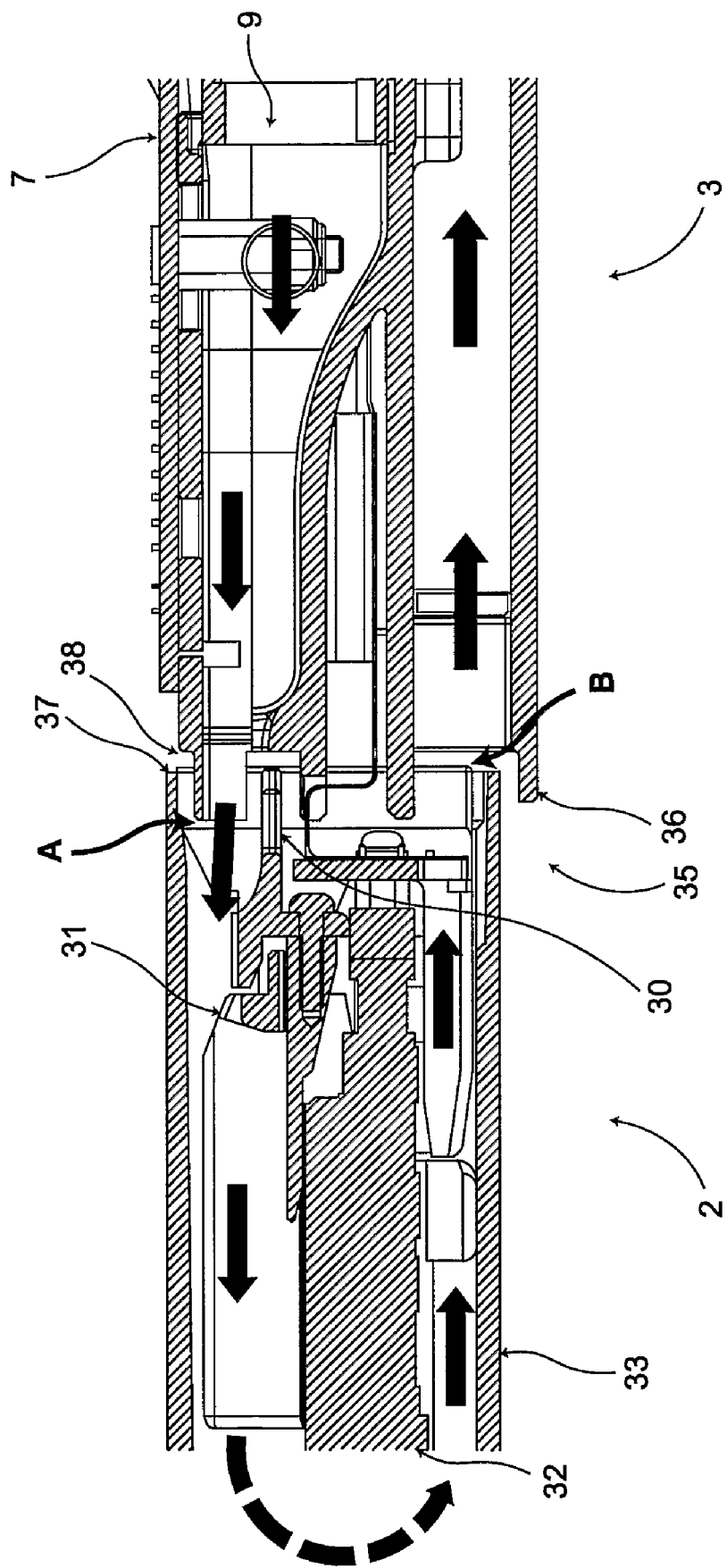
FIG. 5 shows a longitudinal cross-sectional view through a portion of an example of an embodiment of an environment test card and a disk drive mounting device having a disk drive therein.

Referring now particularly to FIG. 5, there is shown a portion of an environment test card 7 connected via a data and power connection 30 to a disk drive 31. The disk drive 31 in this example is supported in a disk drive tray or carrier 32 which in turn is received in a disk drive mounting device 33 (an example of which will be discussed further below), which in turn is mounted in the front section 2 of the apparatus 1. In use, air is forced by the cooling fan 9 to blow from the environment test card 7 into the disk drive mounting device 33, over the disk drive 31, from where the air returns (optionally via the ducts 11,12 and a heat exchanger) to the environment test card 7 from where it can be recirculated over the disk drive 31, as shown by the heavy arrows in FIG. 5. To minimise the physical contact between the front and rear sections 2,3, a non-contact seal 35 is used to seal the air flow.

In this example, the non-contact seal 35 is achieved by overlapping the front portion 36 of the environment test card 7 with the rear portion 37 of the disk drive mounting device 33 so as to leave an air gap 38 therebetween. Furthermore, this overlapping is arranged so that as air exits the front portion 36 of the environment test card 7 and enters the disk drive mounting device 33, it meets an enlarged cross-sectional area (at position A in FIG. 5) and thus experiences a pressure drop. Similarly, as air exits the disk drive mounting device 33 and returns to the environment test card 7, it again meets a region of greater cross-sectional area (indicated at B) and thus again experiences a pressure drop. In each case, the pressure drop tends to inhibit the escape of air and thus provides an effective seal without the seal having to be a contact seal.

It is a fact that disk drives are used in increasingly diverse ranges of conditions. For example, disk drives are required to be used in a wide range of temperatures. For example, disk drives are being fitted in various systems for use in road vehicles, in order to provide storage for maps or navigation, storage of digital music files, etc., etc. It is well known that road vehicles are in general subjected to both very low temperatures and very high temperatures. Thus, it is increasingly important for manufacturers to be able to test the disk drive over a wide range of temperatures and, more particularly, to know more precisely the temperature of the disk drive itself during the testing procedure. As mentioned above, historically the temperature of the disk drive has been monitored only indirectly during the test process by measuring the temperature of the air flowing across the disk drive and inferring the temperature of the disk drive from that measurement. In the preferred embodiment of the present apparatus, the temperature of the disk drive 31 is measured directly.

Figure 6A:
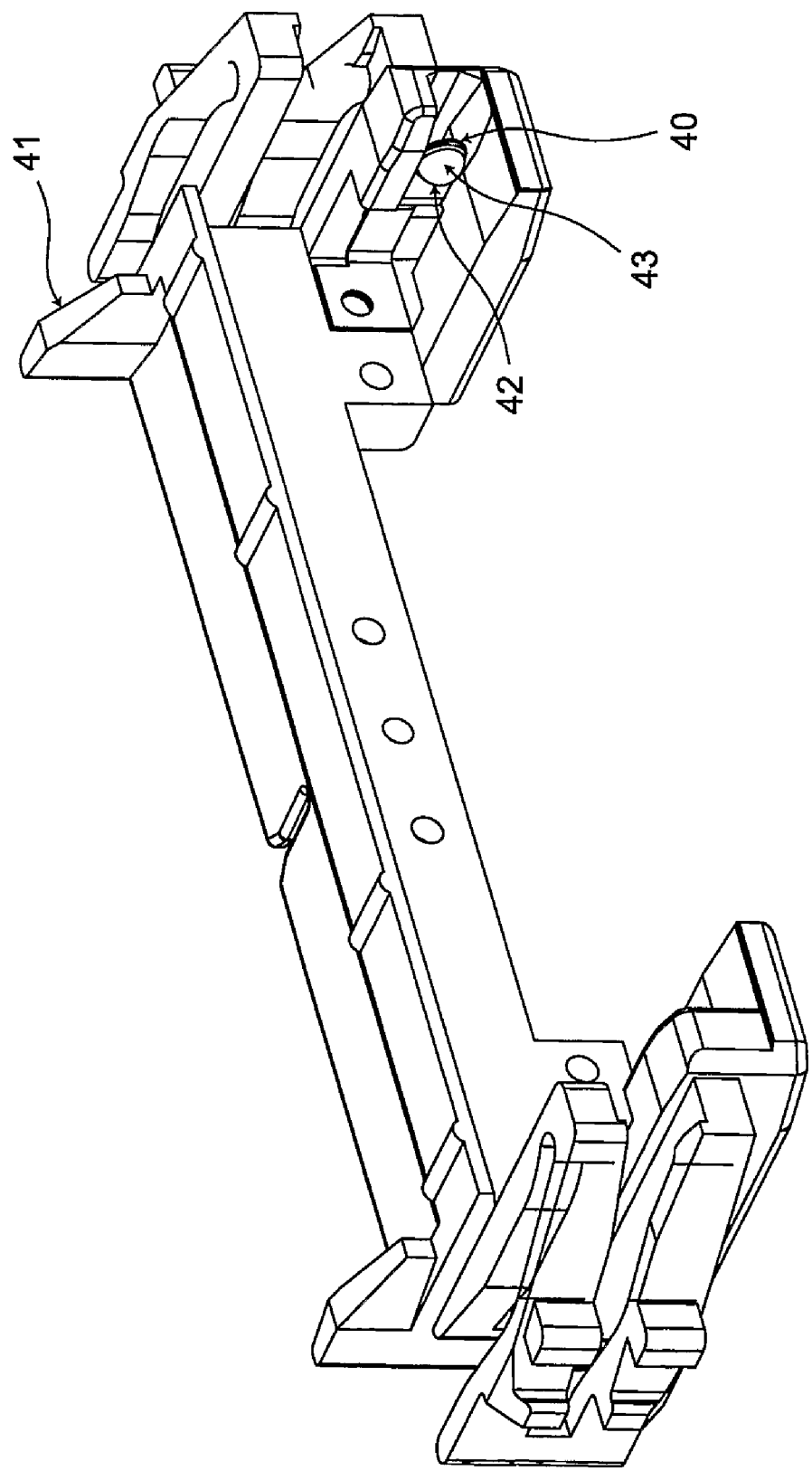
FIGS. 6A to 6D show perspective views of an example of an embodiment of a connector having a temperature sensor mounted therein and the contact of the temperature sensor with a disk drive.
Figure 6B:
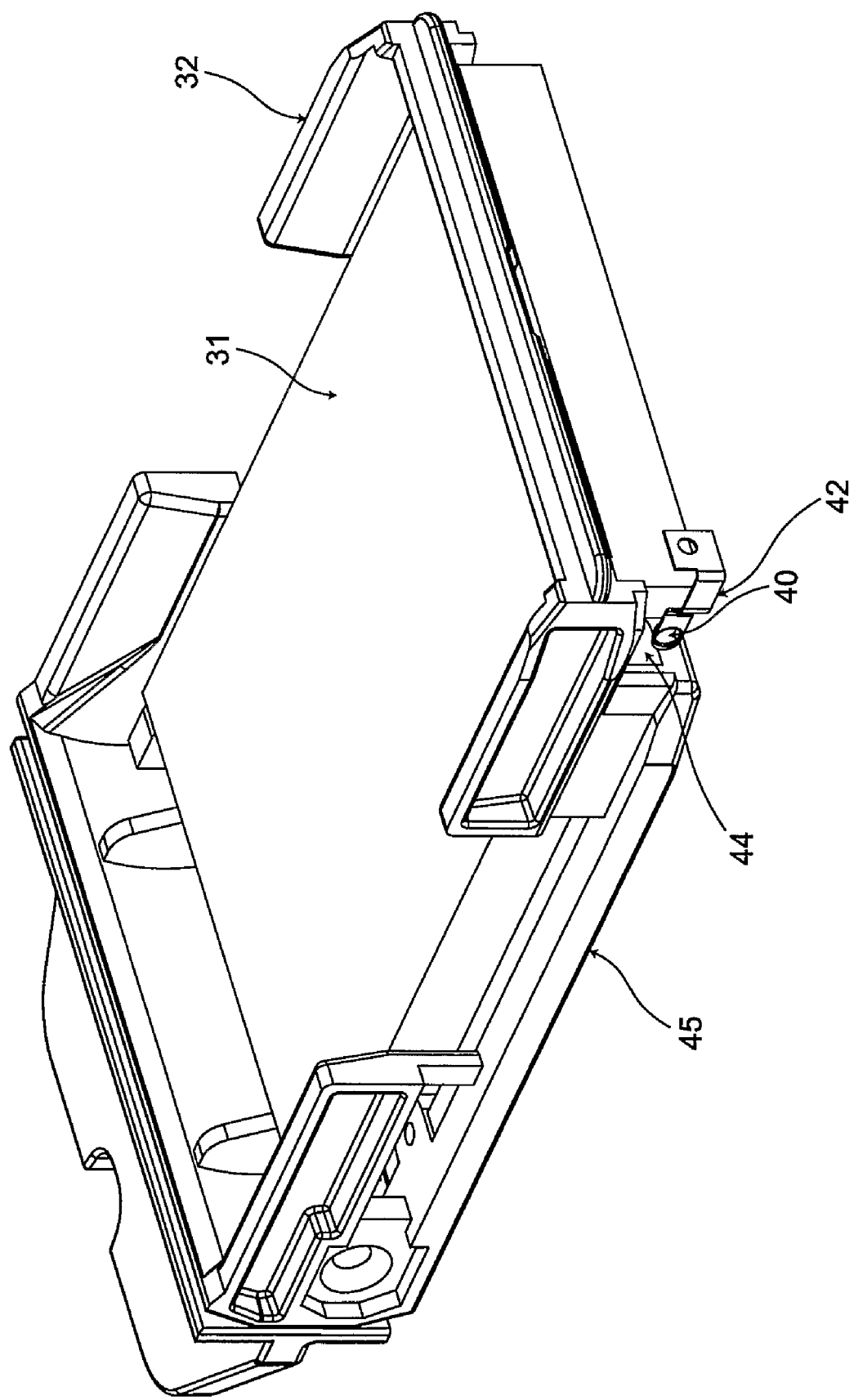
Figure 6C:
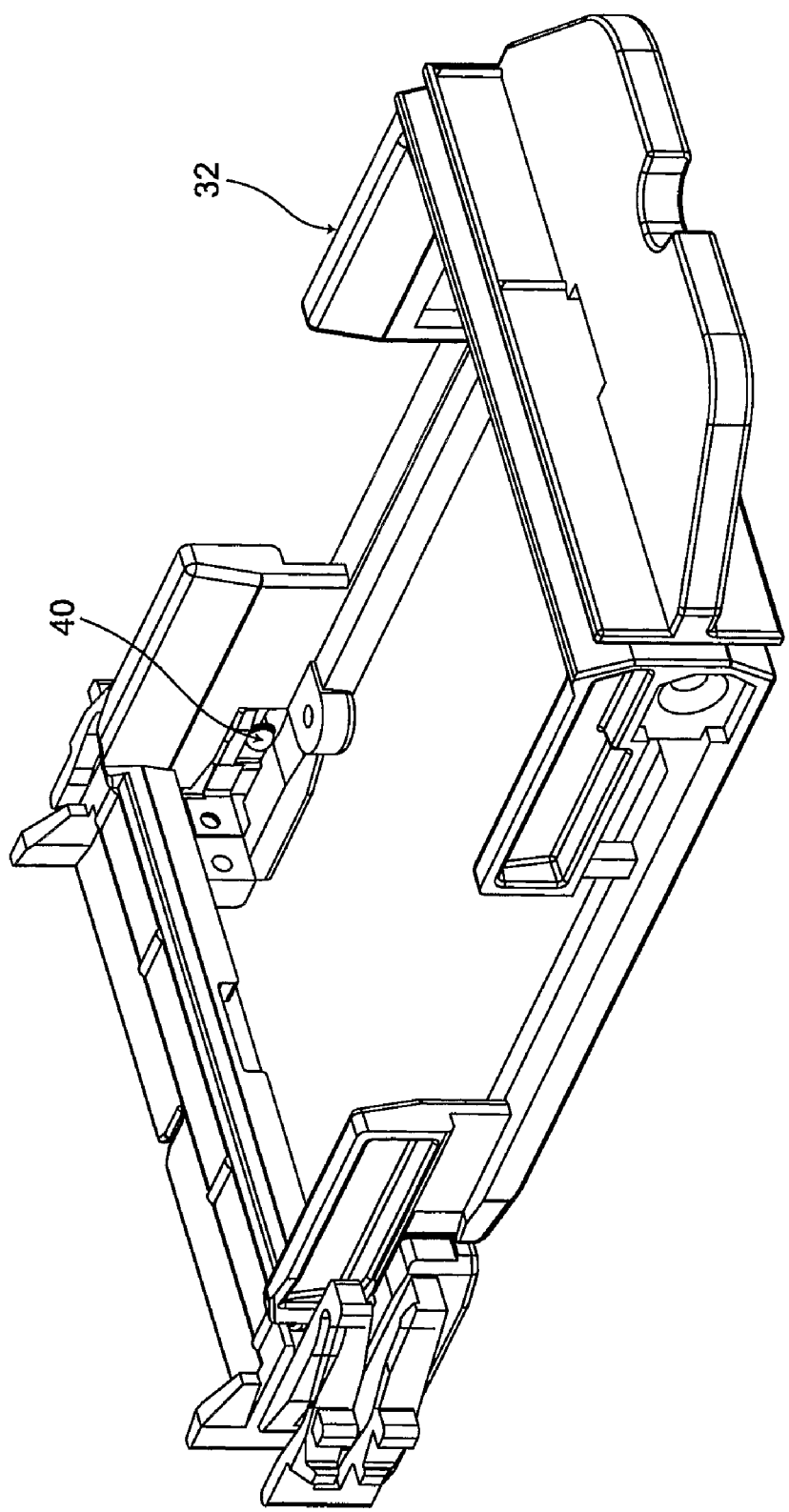
Figure 6D:
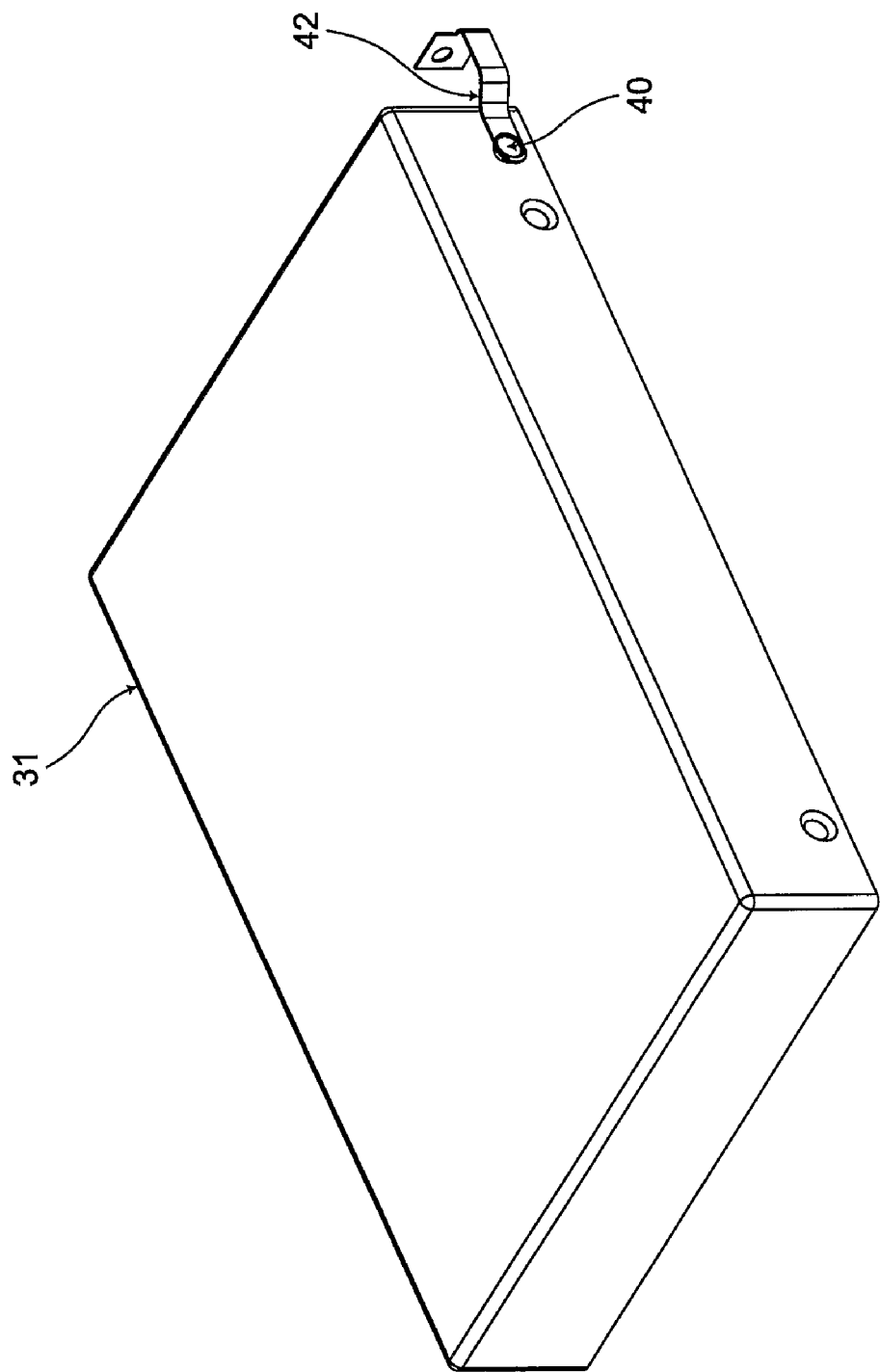
Figure 7A:
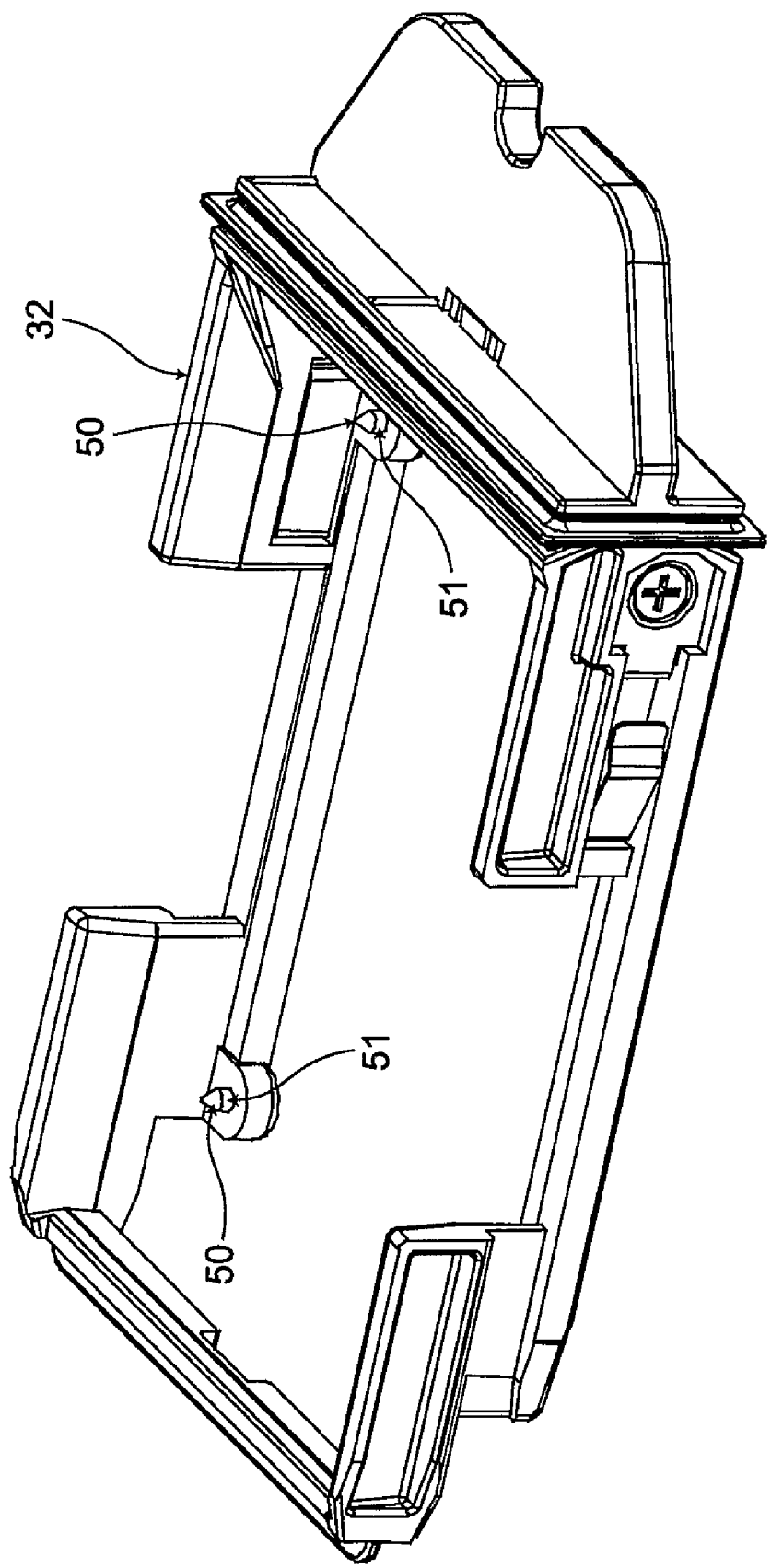
FIGS. 7A to 7D show perspective views of an example of an embodiment of a disk drive carrier tray having a temperature sensor mounted therein and connections for the disk drive tray to a connector; and, FIGS. 8A to 8C show perspective views of an example of an embodiment of a disk drive mounting device having a mass and damping material fixed thereto.
Figure 7B:
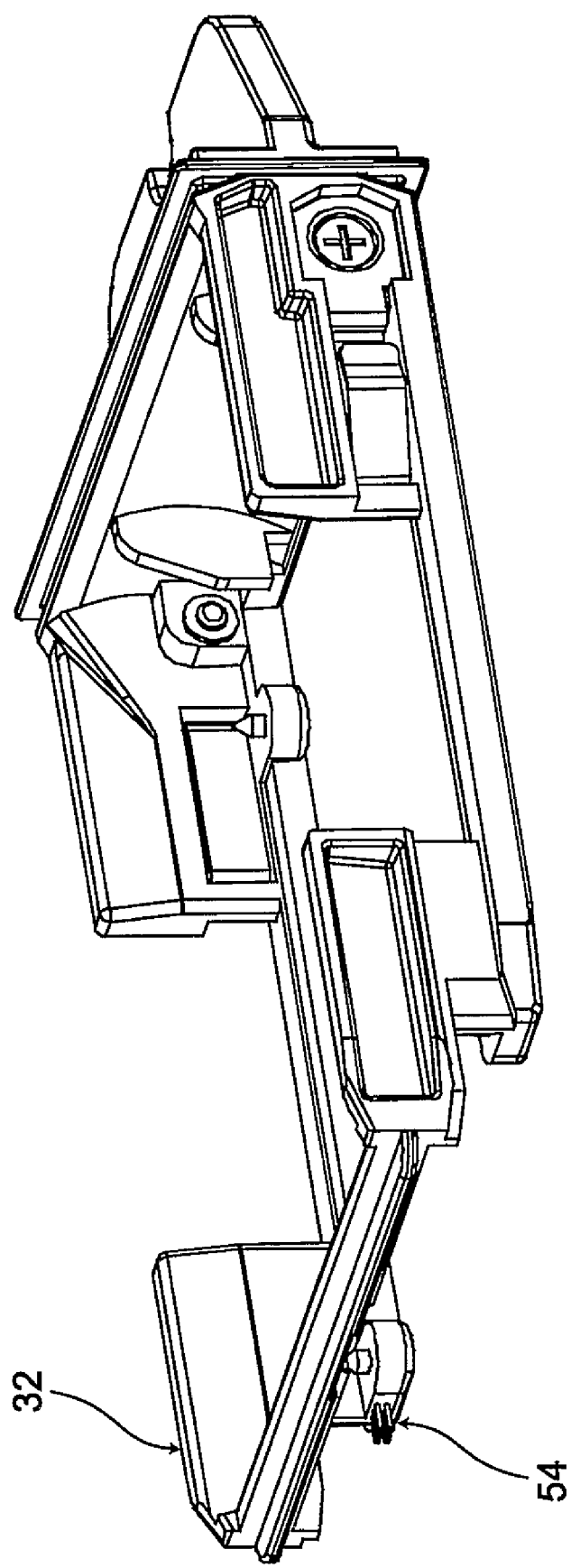
Figure 7C:
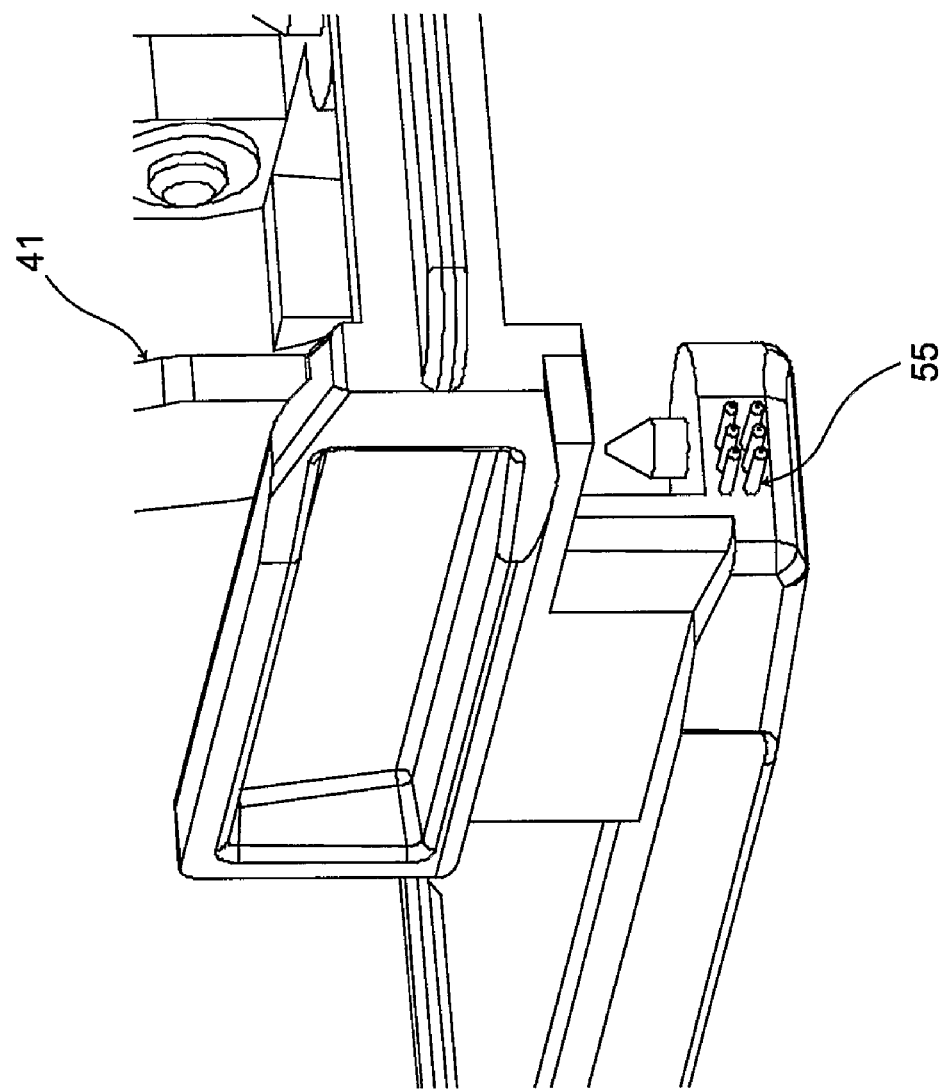
Figure 7D:
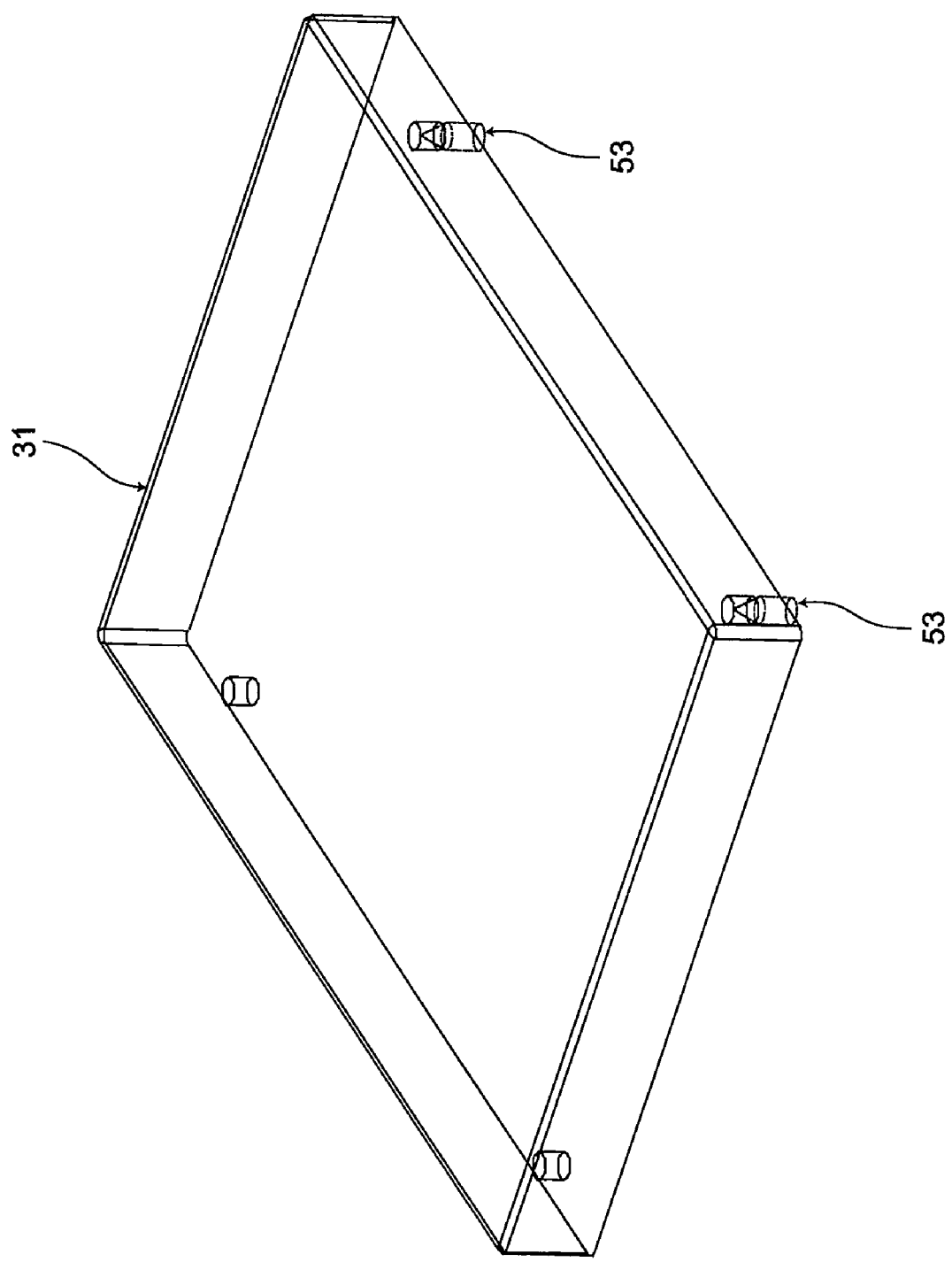

Referring now to FIGS. 6A to 6D, in one possible arrangement a temperature sensor 40 is mounted on a physical connector 41 to which the disk drive carrier 32 connects in the front section 2 of the apparatus 1. In the preferred example, the temperature sensor 40 is mounted on the free end of a cantilevered resilient spring arm 42. This spring-mounting biases the temperature sensor 40 inwards towards the disk drive 31 and thus helps to ensure that there is good physical contact with the disk drive 31 irrespective of variations in the size and position of the disk drive 31 owing to manufacturing tolerances and the like. Moreover, the spring-mounting also helps to minimise the effect of vibrations. In the example shown, the temperature sensor 40 is covered by a smooth, domed plastics cap 43, which helps prevent scratching or other damage to the surface of the disk drive 31 as the disk drive 31 in its carrier 32 is moved into and out of the disk drive mounting device 33. As shown in FIGS. 6B and 6C in particular, the disk drive carrier 32 has an aperture 44 in a side wall 45 to allow the temperature sensor 40 to project into the body of the disk drive carrier 32 so as to be able to contact a side wall of the disk drive 31 as shown in FIG. 6D. It will be appreciated that it is preferred to mount the temperature sensor 40 at a position such that it is shielded from the air flow passing over the disk drive 31.

Referring now to FIGS. 7A to 7D, as an alternative or in addition, a temperature sensor 50 can be mounted in one or more of the disk drive location pins 51 conventionally provided in the disk drive carrier 32. Typically, there are four such pins 51 which in use are received in respective mounting holes 53 provided as standard in the under surface of the disk drive 31. The mounting of a temperature sensor 50 in a location pin 51 also means that the temperature sensor 50 is shielded from the air flow passing over the disk drive 31. The carrier 32 has a data connector 54 on its rear surface which engages in use with a corresponding data connector 55 on the physical connector 41 to which the carrier 32 is connected in use so that signals from the temperature sensor 50 can be passed to the environment test card 7.

It can be beneficial to have several temperature sensors 40 which contact the disk drive 31 at several different points. In practice, the temperature of the disk drive 31 is different at different positions on the disk drive 31 due to localised heating effects within the disk drive 31. Measuring the temperature at several points, which can only be achieved by using a direct temperature measurement, provides the advantage that the temperature of the disk drive 31 can be mapped over its surface, giving a much more accurate reading of the temperature and temperature variation over the disk drive 31. Thus, temperature sensors 40,50 may be mounted at several locations within the front section 2 and in one or more of the location pins 51 of the carrier 32 and/or elsewhere.

Moreover, many disk drives now have their own internal temperature sensors which are used when the disk drive is in use by an end user in a storage application. In one example, therefore, an additional measurement of the temperature of the disk drive 31 is obtained by using the drive's own internal temperature sensor. This can be compared with the temperature as measured by one or more of the external temperature sensors 40,50.

A further advantage of providing several direct contact temperature sensors 40,50 is that different ones of the temperature sensors 40,50 can be used with different drives, it being understood that different drives have different temperature characteristics such that one drive might be hottest at one particular location whereas a different type of drive might be hottest at a different location.

As mentioned above, in the preferred apparatus 1, the disk drive 31 is supported in a disk drive carrier 32. The use of a carrier 32 facilitates automatic robotic handling of the disk drive 31. Various examples of disk drive carriers are disclosed in for example our WO-A-03/021597, WO-A-03/021598, PCT/GB2004/002505 (equivalent to U.S. application Ser. No. 10/866,074) and PCT/GB2004/003812, the entire disclosures of which are hereby incorporated by reference.

Figure 8A:
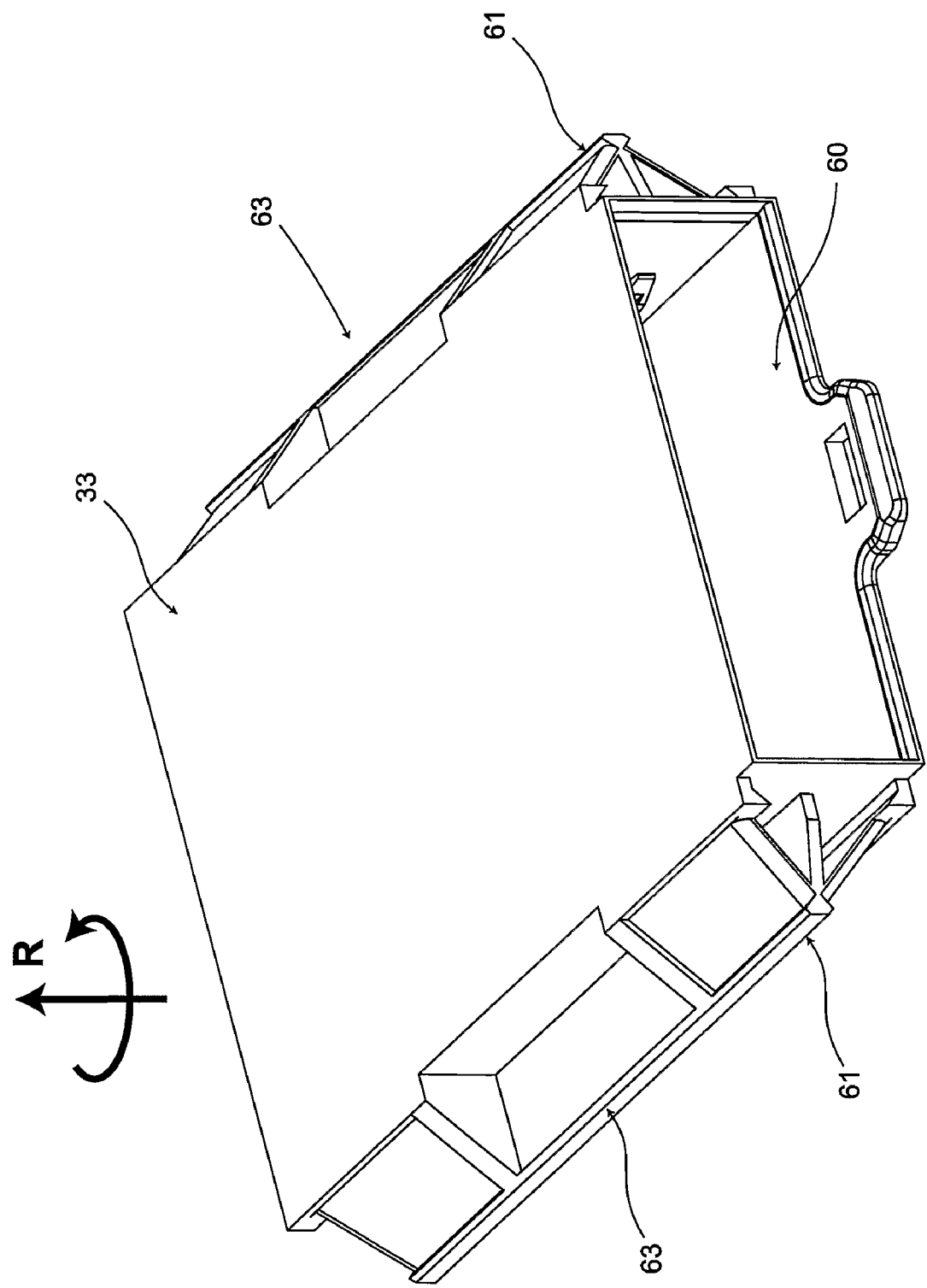
Figure 8B:
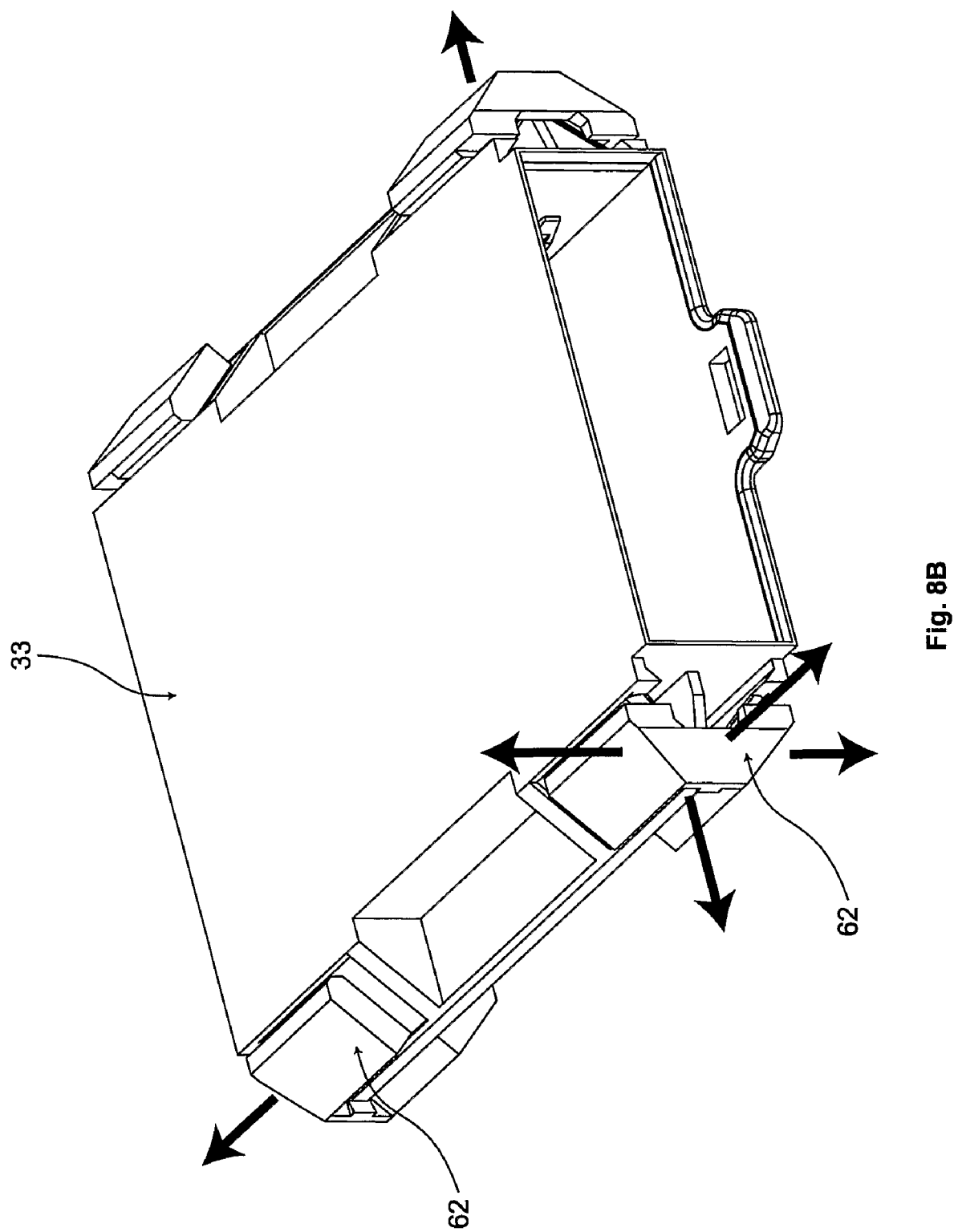
Figure 8C:
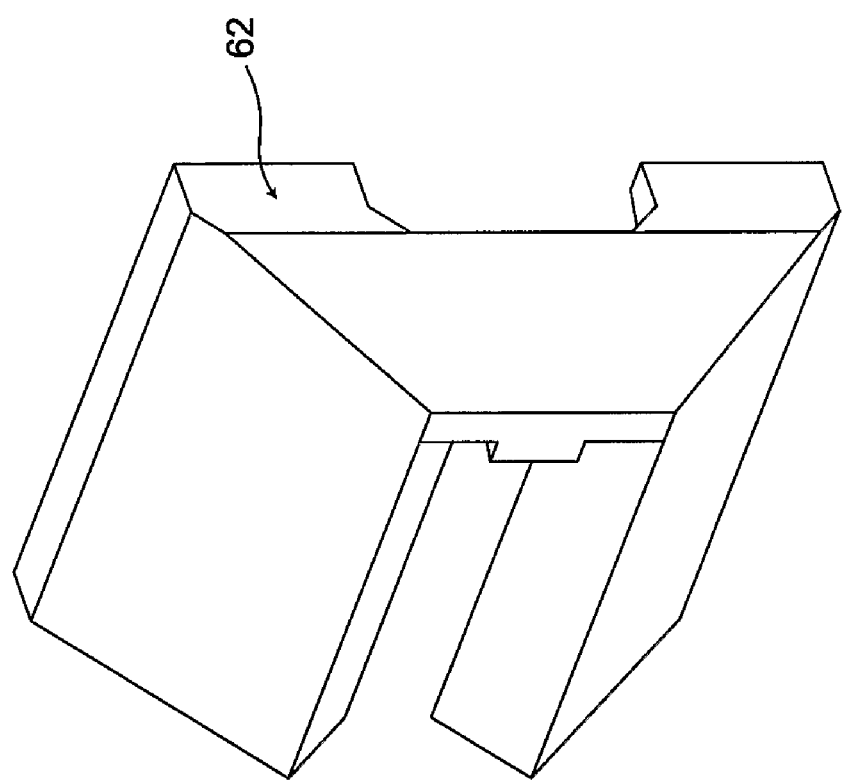

As mentioned above, the disk drive carrier 32 is inserted into a disk drive mounting device 33 which is mounted in the front section 2 of the apparatus 1. A preferred disk drive mounting device 33 is shown most clearly in FIGS. 8A and 8B. The mounting device 33 is of generally sleeve-like form and defines a bay 60 of rectangular cross-section into which the disk drive 31 in its carrier 32 is inserted. The mounting device 33 has longitudinal external side walls 61 which are generally angled to the rotational axis R of the disk drive 31 when received in the mounting device 33. The preferred side walls 61 have a generally triangular cross-sectional shape. This angling provides for a rigid side wall 61, which is better able to resist vibration. The angle to the axis R may be for example anywhere in the range 30° to 60° but is most preferably 45°.

To reduce vibration further, damping material 62 may be added to the side walls 61. In the example shown, four possible locations for the damping material 62 are provided, one at each end of each side wall 61. The external shape of the damping material 62 corresponds to the external shape of the side wall 61 and as such is angled so as to be of generally triangular cross-sectional shape (though the apex may be truncated as shown). This angling of the damping material 62 means that the material is better able to damp vibrations in the three orthogonal directions. Moreover, it also means that the damping material 62 does not operate exclusively in sheer mode or in compression/extension, which improves the vibration damping properties of the material.

A further feature of the preferred mounting device 33 is that it is possible to add masses 63, such as one or more metal weights. One or more of the masses 63 may be fixed to one or both long side walls 61. The weight and size and position of the masses 63 can be set so as to "tune" the vibrational dynamic performance of the mounting device 33 so as to minimise the effect of vibrations on the disk drive 31. For example, one or more masses 63 may be fitted so as to move the effective centre of rotation of the mounting device 33 to be away from the pivot mount for the read/write heads of the disk drive 31 when mounted in the mounting device 33. Given that disk drives of different types have their read/write heads pivoted at different positions, different masses 63 can be fitted, possibly at different locations on the mounting device 33, so as to optimise the performance of the mounting device 33 for the particular disk drive 31.

Embodiments of the present invention have been described with particular reference to the examples illustrated. However, it will be appreciated that variations and modifications may be made to the examples described within the scope of the present invention. Furthermore, the claims that follow relate entirely or principally to apparatus or devices. It will be appreciated that corresponding methods are also within the scope of the present invention.

The invention claimed is:
1. Disk drive test apparatus, the apparatus comprising:
a plurality of bays each for receiving a respective disk drive to be tested;
a plurality of card slots each for receiving a test card via which a disk drive can be tested; and, a plurality of test cards, each test card being received in a respective card slot, each of the test cards being either an environment test card or an interface test card;

the card slots and the test cards being arranged such that each card slot can selectively receive an environment test card or an interface test card to control the environment of a respective disk drive to be tested in its bay.

2. Apparatus according to claim 1, wherein the card slots, the or each environment test card and the or each interface test card are arranged such that each card slot can selectively receive an environment test card or an interface test card without interfering physically with any other card slot such that each card slot can be filled with a test card.

3. Apparatus according to claim 1, the apparatus comprising at least one environment test card and at least one interface test card.

4. Apparatus according to claim 1, the apparatus comprising a respective card slot for each bay.

5. Disk drive mounting apparatus, the apparatus comprising:

a frame;

a disk drive holder for receiving at least one disk drive, the disk drive holder being fixed to or integrally formed with the frame; and, a card holder for receiving at least one card via which said disk drive can be tested or operated, the card holder being removably received in the frame, the card holder being arranged to receive an environment test card to control the environment of a disk drive in the disk drive holder.

6. Apparatus according to claim 5, wherein the disk drive holder is constructed and arranged to receive plural disk drives and the card holder is constructed and arranged to receive a corresponding plurality of cards.

7. Apparatus according to claim 5, wherein the disk drive holder comprises a disk drive mounting device in which a disk drive can be mounted, the disk drive mounting device being removable from the disk drive holder without having to detach the disk drive holder from the frame.

8. Disk drive mounting apparatus, the apparatus comprising:

a disk drive holder for receiving at least one disk drive; and, a card holder containing at least one card via which said disk drive can be tested or operated and at least one fan for causing air to pass over said disk drive;

the disk drive holder and the card holder being operatively connected to each other via a non-contact sealing arrangement such that the disk drive holder and the card holder are substantially mechanically isolated from each other whilst air can pass from the card holder into the disk drive holder and over said disk drive.

9. Apparatus according to claim 8, wherein the disk drive holder and the card holder are arranged such that at least some of the air that has passed over said disk drive then passes back to the card holder.

10. Apparatus according to claim 8, wherein the sealing arrangement is such that there is an air gap between the disk drive holder and the card holder and such that the air experiences a pressure drop as air passes from the card holder into the disk drive holder and as air passes from the disk drive holder into the card holder.

11. Apparatus according to claim 8, wherein the at least one card carries at least one fan for causing air to pass from the card holder into the disk drive holder and over said disk drive.

* * * * *